(12) United States Patent
Thodiyil et al.

(10) Patent No.: US 9,363,524 B2
(45) Date of Patent: Jun. 7, 2016

(54) METHOD AND APPARATUS FOR MOTION COMPENSATION REFERENCE DATA CACHING

(71) Applicant: Amlogic Co., Ltd., Santa Clara, CA (US)

(72) Inventors: John A. Thodiyil, Santa Clara, CA (US); Shi Chen, Cupertino, CA (US); Xuyun Chen, San Jose, CA (US)

(73) Assignee: Amlogic Co., Limited, Hong Kong (HK)

( * ) Notice: Subject to any disclaimer, the term of this patent is extended or adjusted under 35 U.S.C. 154(b) by 289 days.

(21) Appl. No.: 14/010,454

(22) Filed: Aug. 26, 2013

(65) Prior Publication Data

US 2015/0055707 A1 Feb. 26, 2015

(51) Int. Cl.
*H04N 19/433* (2014.01)
*H04N 19/423* (2014.01)

(52) U.S. Cl.
CPC .................................. *H04N 19/433* (2014.11)

(58) Field of Classification Search
CPC .................................................. H04N 19/433
USPC ..................................................... 375/240.16
See application file for complete search history.

(56) References Cited

U.S. PATENT DOCUMENTS

| | | | | |
|---|---|---|---|---|
| 6,707,853 B1 * | 3/2004 | Cook | ..................... | H04N 19/51 348/E5.108 |
| 7,965,773 B1 * | 6/2011 | Schlanger | ................. | G06T 1/60 375/240.16 |
| 8,225,043 B1 * | 7/2012 | Kohn | .................. | G06F 12/0875 711/118 |
| 8,446,955 B2 * | 5/2013 | Sadowski | ............. | H04N 19/176 375/240.16 |
| 2002/0080870 A1 * | 6/2002 | Piazza | .................... | H04N 19/51 375/240 |
| 2004/0264565 A1 * | 12/2004 | MacInnis | ............. | H04N 19/433 375/240.01 |
| 2006/0050976 A1 * | 3/2006 | Molloy | .................. | H04N 19/51 382/233 |
| 2007/0176939 A1 * | 8/2007 | Sadowski | ............... | G09G 5/393 345/557 |
| 2008/0285652 A1 * | 11/2008 | Oxman | .................. | H04N 19/61 375/240.16 |
| 2010/0316129 A1 * | 12/2010 | Zhao | ...................... | H04N 19/61 375/240.16 |
| 2012/0233405 A1 * | 9/2012 | Budagavi | ............ | G06F 12/0844 711/118 |
| 2014/0105305 A1 * | 4/2014 | Young | ................... | H04N 5/145 375/240.16 |

FOREIGN PATENT DOCUMENTS

CN 101304520 A * 11/2008 .......... G06F 12/0862
CN 102340662 A * 2/2012

* cited by examiner

*Primary Examiner* — Christopher S Kelley
*Assistant Examiner* — Kathleen Walsh
(74) *Attorney, Agent, or Firm* — Venture Pacific Law, PC

(57) ABSTRACT

A method and apparatus for processing a current macro-block of a current frame for motion compensation based on reference data from a reference frame using a sliding window cache to cache the reference data are disclosed. The method steps comprise processing a current sub-block of the current macro-block for motion compensation, determining the reference data for the current sub-block based on a reference sub-block in the reference frame, determining whether the reference data is within a sliding window, if the reference data is within the sliding window, checking for a valid tag corresponding to the reference data, responsive to the valid tag, retrieving the reference data from within the sliding window cache and processing the reference data for motion compensation.

20 Claims, 6 Drawing Sheets

METHOD AND APPARATUS FOR MOTION COMPENSATION REFERENCE DATA CACHING

BACKGROUND

1. Technical Field

This disclosure generally relates to video decoding, and more particularly to motion compensation related reference picture fetch caching.

2. Related Art

Compression and encoding technologies are widely used in order to transmit and store still image data and moving image data with good efficiency. In the case of moving images, there are many known types of video compression, including those associated with the Motion Pictures Expert Group ("MPEG") among others. However, for purposes of clarity by way of example and not limitation, MPEG terminology is used. The methods MPEG-1 to 4 or ITU (International Telecommunication Union) H.261 to H.264 are widely used for video compression.

In video compression, motion compensation may be used. Generally, a video sequence includes a number of pictures or frames. Frames in a sequence are often substantially similar, and thus contain a significant amount of redundant information. In order to reduce the amount of data needed to represent the video, redundant information may effectively be removed by using a reference frame and a number of residual frames. As residual frames are indexed to a reference frame, the residual frames may contain less information than the reference frame. Accordingly, the residual frames may be encoded at a lower bit rate with the same quality as associated original frames from which the residual frame were derived.

Although there are other approaches to approximate motion of an entire scene and objects in a video sequence which may produce higher quality residual frames than the motion compensation approach of subtracting differences between frames, the effective bit rate of higher quality video compression is significantly much larger.

Using the generalized MPEG approach, frames are processed in groups. One frame, often the first frame of a group of frames, is encoded without motion compensation as a reference frame. The reference frame, which is an intracoded frame ("I-frame" or "I-picture") is combined with predicted frames ("P-frames or P-pictures"). One or more P-frames may be predicted from a preceding I-frame or P-frame.

Moreover, frames may be predicted from future frames. Predicted frames from future frames may be predicted from two directions, such as for example from an I-frame and a P-frame that respectively immediately precede and follow the bidirectionally predicted frame. Conventionally, bidirectionally predicted frames are called "B-frames" or "B-pictures". Since MPEG video encoding is well known, further details regarding specifics of MPEG video encoding are not described.

One main goal in video compression is to reduce the effective bit rate of the encoded video stream. During playback, video decoding relies on similar scenes from previous and/or adjacent frames that have been encoded to produce a current frame. As such, decoding can rely heavily on previously accessed data. Intense data access can be directly associated with more power consumption, particularly in portable hand held device like smarts phones, phablets, tablets, laptops, etc. when their battery power is limited. Even with consumer appliances, desktop devices, TVs, video player, etc., reducing heavy data access is important not only from a power consumption standpoint, but from a performance standpoint. If a device can be operated at a lower frequency to accommodate more efficient data access, the entire system for the device can operate at the lower frequency. As more performance demand is required, there is built-in margin within the system than can afford the system to operate at an increased frequency for increased performance. The built-in margins also afford system designs that can have a longer product life cycle without the need to upgrade.

FIG. 1 illustrates a generalized prior art motion compensation apparatus or video coding using the H.264 video encoding standard that estimates a motion vector between pictures on a block-by-block basis. The motion compensation apparatus includes a command queue 2, motion compensation block 3, DRAM controller 4, and picture reconstruction block 5. The motion compensation apparatus receives a current picture to be decoded including a current block to be decoded, as well as a reference picture which is referred to for decoded motion vectors. Command queue 2 provides a series of commands to the motion compensation block 3, and based on the commands, the motion compensator block 3 sends requests to the DRAM controller to retrieve reference blocks from memory to interpolate the reference block based on the motion vectors of the current block. The interpolated data is sent to the picture reconstruction block 5 to reconstruct the picture based on the motion vector data.

The reduction of bit rate by the video encoder comes at the expense of increased DRAM bandwidth at the video decoder. DRAM access is general is resource and power intensive. What is needed is a video decoding apparatus that can effectively decode a video stream using motion vectors which uses less system resource utilization and power consumption of previous decoder systems.

SUMMARY OF INVENTION

The present invention provides a cache controller in the path of 2D reference fetch for the purpose of motion compensation in the process of decoding a bit stream. There can be tremendous reuse of fetched data at the processing localities that can exploited with innovative design. Accordingly, a method and apparatus for processing a current macro-block of a current frame for motion compensation based on reference data from a reference frame using a sliding window cache to cache the reference data are disclosed. The method comprise processing a current sub-block of the current macro-block for motion compensation, determining the reference data for the current sub-block based on a reference sub-block in the reference frame, determining whether the reference data is within a sliding window, if the reference data is within the sliding window, checking for a valid tag corresponding to the reference data, responsive to the valid tag, retrieving the reference data from within the sliding window cache, and processing the reference data for motion compensation.

In accordance to another embodiment of the present invention, if the step of checking for a valid tag corresponding to the reference data is an invalid tag, the method retrieves the reference data from memory using a DRAM controller. Data access using the DRAM controller is much slower than accessing data in the cache.

In accordance to another embodiment of the present invention, once the data is retrieved from DRAM, the method updates valid tag corresponding to the reference data and updating the sliding window cache with the reference data. The cached reference data can be rapidly retrieved when needed again.

DETAILED DESCRIPTION

Figure 1:
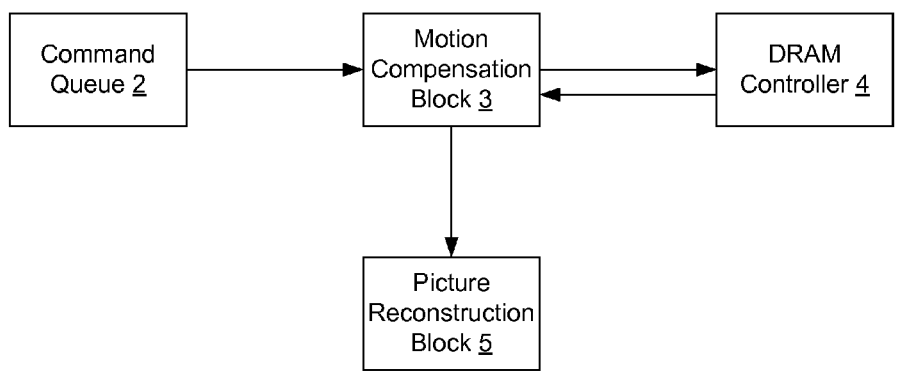
FIG. 1 illustrates a generalized prior art motion compensation apparatus for a H264 decoder.
Figure 2:
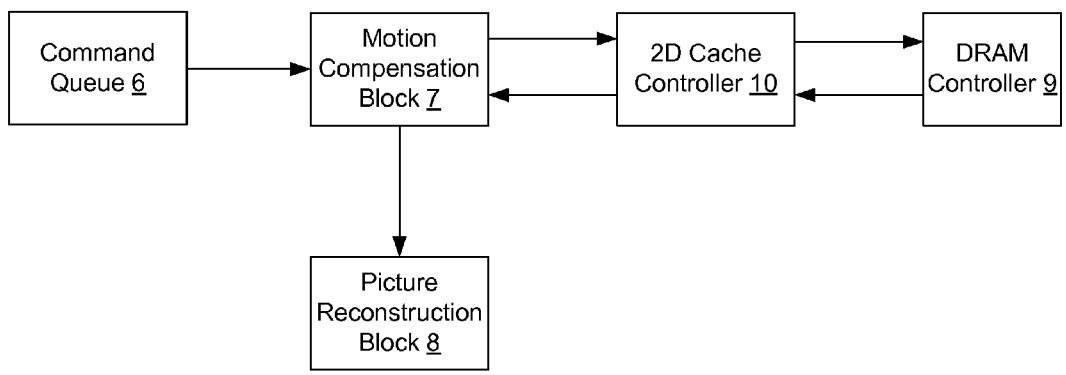
FIG. 2 illustrates a simplified cached motion compensation block apparatus having a motion compensation reference cache controller (MCRCC) in accordance with an embodiment of the present invention.

FIG. 2 illustrates a simplified cached motion compensation block apparatus 100 having a motion compensation reference cache controller (MCRCC) 10 in accordance with an embodiment of the present invention. The cached motion compensation block apparatus 100 includes a command queue 6, motion compensation block 7, picture reconstruction block 8, DRAM controller 9, and the motion compensation reference cache controller or 2D cache controller 10. In general, command queue 6 provides a series of commands to the motion compensation block 7, and based on the commands, the motion compensator block 7 sends requests for reference blocks to the MCRCC 10. If the MCRCC indicates a hit for the reference block request or in other words has the requested reference block in the MCRCC 10, then the reference block is provided to the motion compensation block 7 for processing. Picture reconstruction block 8 receives interpolated data and reconstructs the picture. If the MCRCC 10 does not have a hit for the requested reference block or in other words does not have the requested reference block in the MCRCC 10, the reference block request is directed to the DRAM controller to retrieve blocks from memory. Once the reference block is received, the motion compensation block 7 interpolates the reference data and is sent to the picture reconstruction block 8 to reconstruct the picture based on the motion vector data.

Most implementation of prefetch use a generalized system cache that does not model the 2D nature of reference data and locality of motion vectors.

Figure 3:
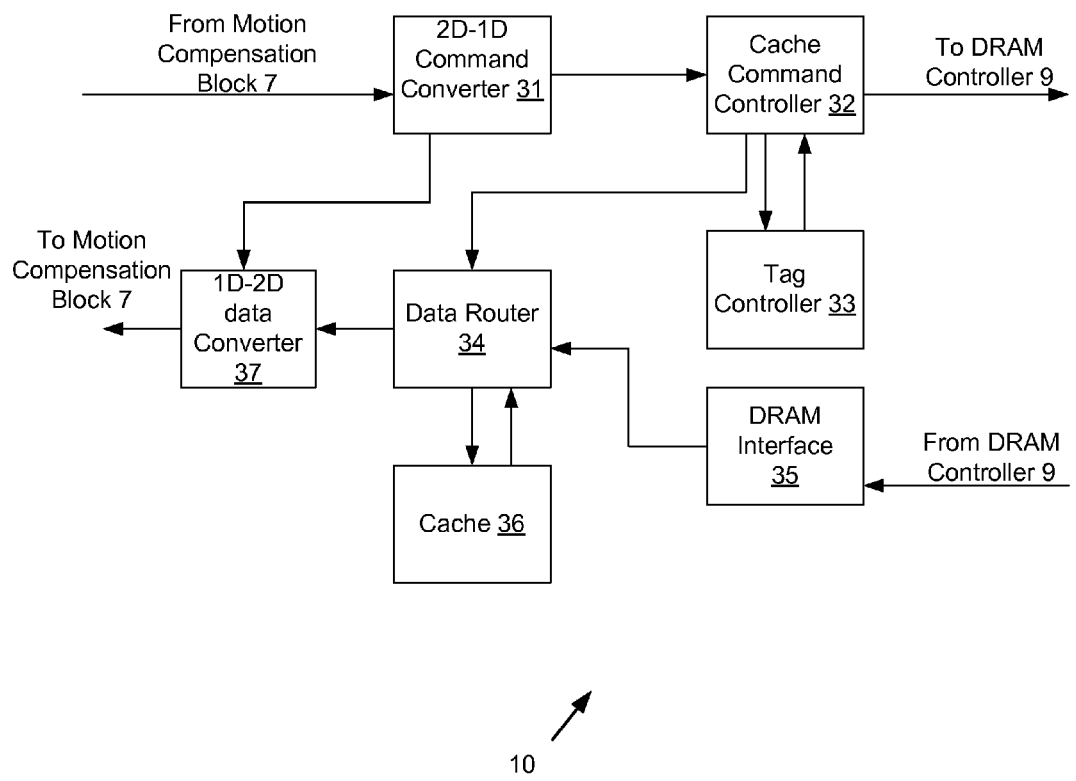
FIG. 3 illustrates a block diagram of the motion compensation reference cache controller (MCRCC) in accordance with an embodiment of the present invention.

FIG. 3 illustrates a block diagram of the MCRCC 10 and includes a 2D-1D command converter 31, cache command controller 32, tag controller 33, data router 34, DRAM interface 35, cache 36, and 1D-2D data converter. The 2D-1D command converter 31 takes a two dimensional x,y command and converts the two dimensional command to a one dimensional command that is aligned to a cache line. The cache command controller 32 receives the one dimensional command and checks if the reference data is within an established cache window. If the cache command controller 32 determines the reference data is within the cache window, an inquiry is made to the tag controller 33 to determine if there is a cache hit. The tag controller 33 maintains a tag table of reference data contained in the cache 36. If there is a tag associated with the one dimensional command request, the tag controller 33 responds with a valid tag. The cache command controller 32 in response to the valid tag or hit response from the tag controller 33, sends the reference data request to the data router 34, which retrieves the reference data from the cache 36 and sends the reference data to the 1D-2D data converter 37 which converts the data back to 2D for the motion compensation block 7 based upon previous 2D-1D conversion data. Motion compensation block interpolates reference data using motion vector.

In accordance to another embodiment of the present invention, if there is not a tag associated with the reference data request, the tag controller 33 will respond with an invalid tag or no cache hit. Upon receipt of the invalid tag, the cache command controller 32 sends the reference data request to the DRAM controller 9 for data fetch. Additional delay and system resources will be required to retrieve the reference data from memory as compared to retrieving the reference data from the cache 36 which is dedicated for motion compensation processing.

If the cache command controller 32 determines the reference data is not within the cache window, a request is made to the DRAM controller 9 to fetch the reference data from memory. The DRAM controller 9 interfaces with the memory that also supports components of a system on chip (SOC). Accordingly, the fetch to memory using the DRAM controller 9 is very resource and time intensive compared to cache access. Once the DRAM interface 35 receives the reference data, the reference data is passed to the data router 34. Data router 34 receives the reference data and sends the reference data to the motion compensation block 7 for further processing. In this instance, in order to retrieve the reference data from memory rather than the cache, additional delay and system resources are used. The reference data request must also compete with other system requests to memory which further delay retrieval of the reference data from memory compared with the cache. Minimizing requests to memory greatly increases the performance of the decoder. Moreover, optimizing the cache window size will minimize system degradation from memory access.

Figure 4:
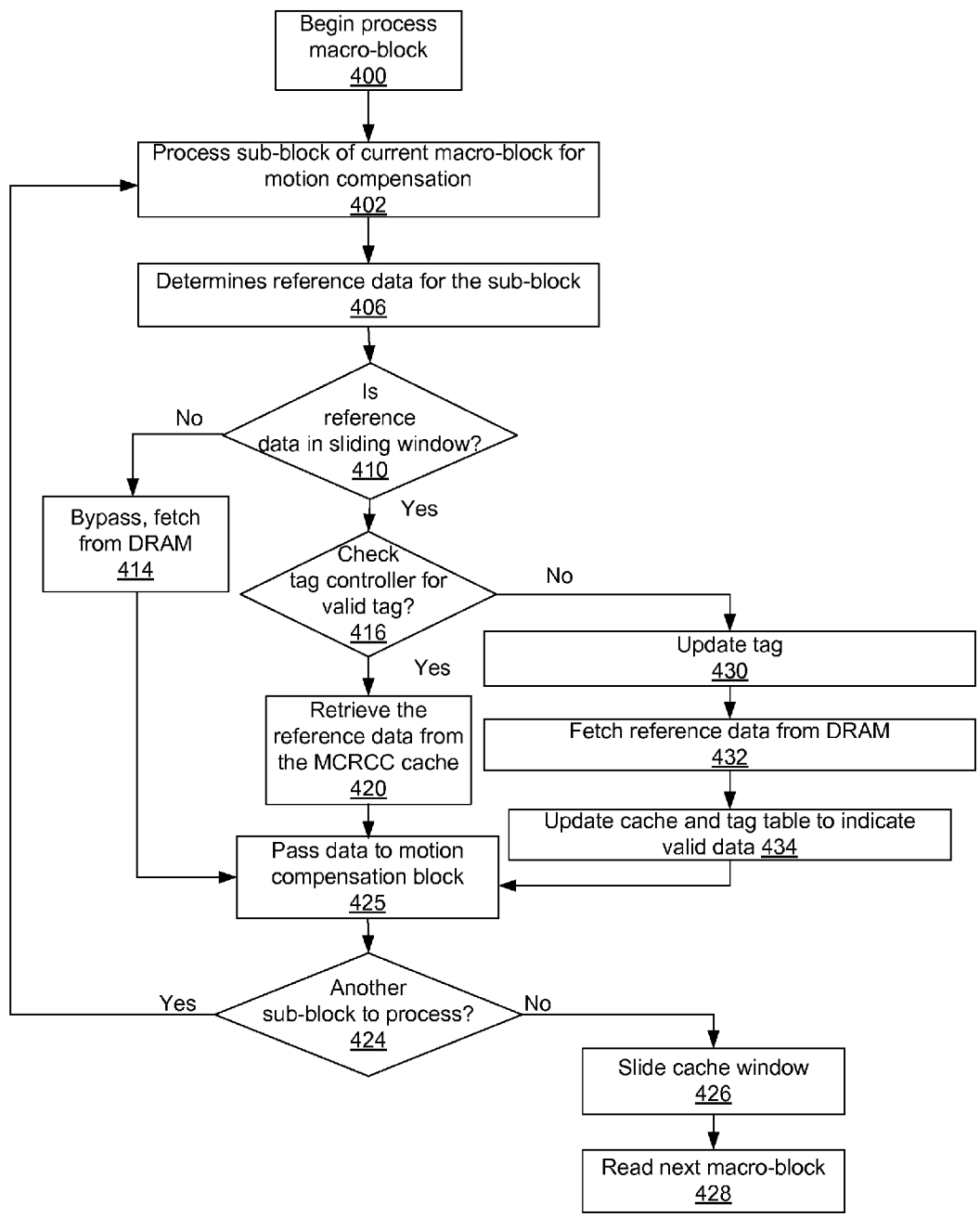
FIG. 4 illustrates a flow diagram of the motion compensation reference cache controller (MCRCC) in accordance with an embodiment of the present invention.

FIG. 4 illustrates a flow diagram of the motion compensation reference cache controller (MCRCC) in accordance with an embodiment of the present invention. The flow diagram 400 begins with process macro-block 400. In step 402, the MCRCC 10 processes a sub-block of current macro-block for motion compensation. In step 406, the MCRCC 10 determines reference data for the sub-block. In decision step 410, the MCRCC determines if the reference data is within an established sliding window? If the reference data is not within the sliding window, a search of the cache is bypassed and the reference data is fetched from DRAM in step 414. If decision step 410 is yes, decision step 416 determines if the tag controller 33 has a valid tag. If tag controller 33 has a valid tag, the reference data is retrieved from the MCRCC cache in step 420. In step 425, the data is passed to motion compensation block for processing. If decision step 416 is no, step 430 updates tag in tag controller 33. Next, step 432 fetches the reference data from DRAM. In accordance to an embodiment of the present invention, an entire cache line is retrieved from the DRAM. In step 434, cache and tag table are updated to indicate valid data. In decision step 424, if there is another sub-block to process, flow diagram returns to step 402 to process another sub-block of the current macro-block for motion compensation. If decision step 424 is no, step 426 slides the cache window by a macro-block. Next, in step 428, the flow diagram returns to process macro-block 400 and continue processing sub-blocks until an entire frame is processed.

It is noted that when B-frames are processed as opposed to P-frames, it is essentially the same as the processing for a single reference frame except there will be two reference frames and the processing of the current sub-block is compared or weighed with a first reference data from a first reference frame and a second reference data from a second reference frame. In accordance to an embodiment of the present invention, two caches and two tag tables support B-frame caching of two reference frame data. The cachable reference frames are programmable and set to select the reference frame that yield the most cache hits.

Figure 5A:
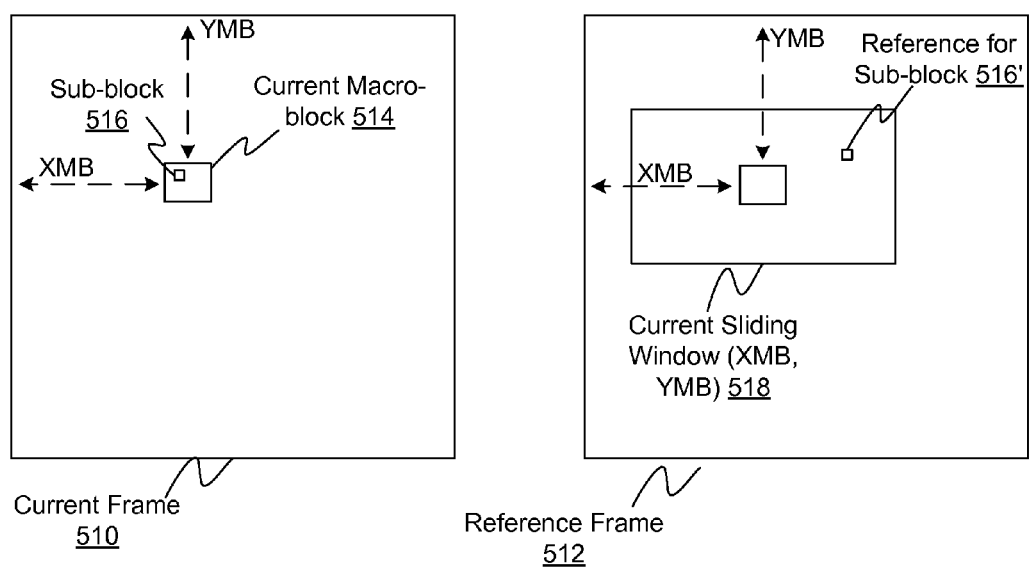
FIG. 5A illustrates a current frame and a reference frame example for caching reference information by the motion compensation reference cache controller (MCRCC) in accordance with an embodiment of the present invention.

FIG. 5A illustrates a current frame and a reference frame example for caching reference information by the motion compensation reference cache controller (MCRCC) in accordance with an embodiment of the present invention. Current frame 510 is an example of a picture frame being processed. Reference frame 512 is an example of the reference picture being compared with the current frame 510 for motion compensation. The current frame 510 includes a plurality of 16 pixels×16 pixels macro-block 514. The macro-block 514 is further divided into sub-blocks 516 as small as 4×4 luma and 2×2 chroma for processing. The reference frame 512 shows a current sliding window 518 within the reference frame 512. The current sliding window 518 represents a cache window that is managed by the MCRCC 10. The sliding window in accordance to an embodiment of the present invention is 6 macro-blocks×3 macro-blocks or 96 pixels×48 pixels. The current macro-block 514 is located at XMB, YMB (X number of macro-blocks, Y number of macro-blocks) within the current frame 510. The sub-block 516 is shown within the current macro-block 514. Similarly, the reference frame 512 has a corresponding reference window with the same coordinate XMB and YMB as the current frame 510. A current sliding window 518 is centered with the same coordinate as the XMB, YMB of the current macro-block 514 of the current frame 510. The current frame 510 sub-block 516 is shown cached in the current sliding window 518 reference for sub-block 516' of the reference frame 512. The current sliding window 518 is cached locally by the MCRCC 10. In accordance to an embodiment of the present invention, the sliding window 518 is 96 pixels by 48 pixels or 6 macro-blocks by 3 macro-blocks in size. Other sized sliding windows can be implemented. The current size provides the best cache hit-rate of 40-80% with minimal increase of performance with increased size for resolution up to 1080 p. Generally, the larger the cache window, the more likelihood there will be a cache hit. However, large caches do utilize more resources to maintain. Accordingly, there may be engineering tradeoffs when implementing the cache. After the current macro-block 514 is processed, processing moves to a next macro-block. Processing of the sub-blocks typically moves from left to right and top to bottom.

Figure 5B:
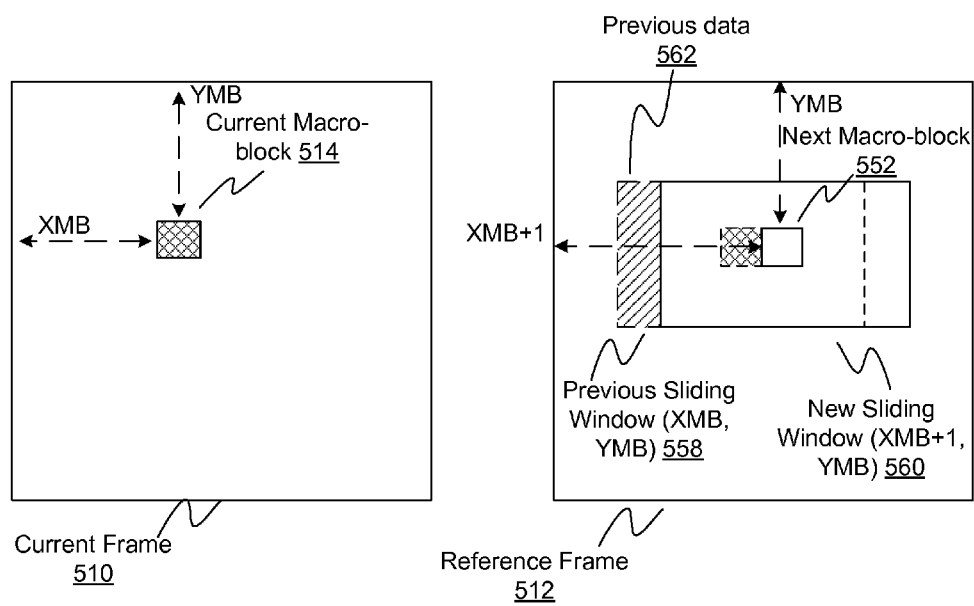
FIG. 5B illustrates shifting of a previous sliding window for caching reference information to a new sliding window and resulting invalidation of previous sliding window cache reference information by the motion compensation reference cache controller (MCRCC) in accordance with an embodiment of the present invention.

Referring to FIG. 5B, as processing of a last sub-block 516 completes, the current macro-block 514 moves to a next macro-block 552 which is the current macro-block location shifted by one macro-block in the X direction. In this instance, a next macro-block 552 is at XMB+1, YMB. As the processing shifts from the current macro-block 514 to the next macro-block 552, previous sliding window 558 at XMB, YMB is also shifted by one macro-block in the X direction or XMB+1. With the shift from previous sliding window 558 to new sliding window 560, previous data 562 associated with the previous sliding window 558 is invalidated by the MCRCC cache. The free space associated with the previous data 562 is allocated for use with the new sliding window 560. In accordance to an embodiment of the present invention, as the sliding window shifts, the center of the sliding window is centered to correspond with the current macro-block XMB, YMB location.

Figure 6:
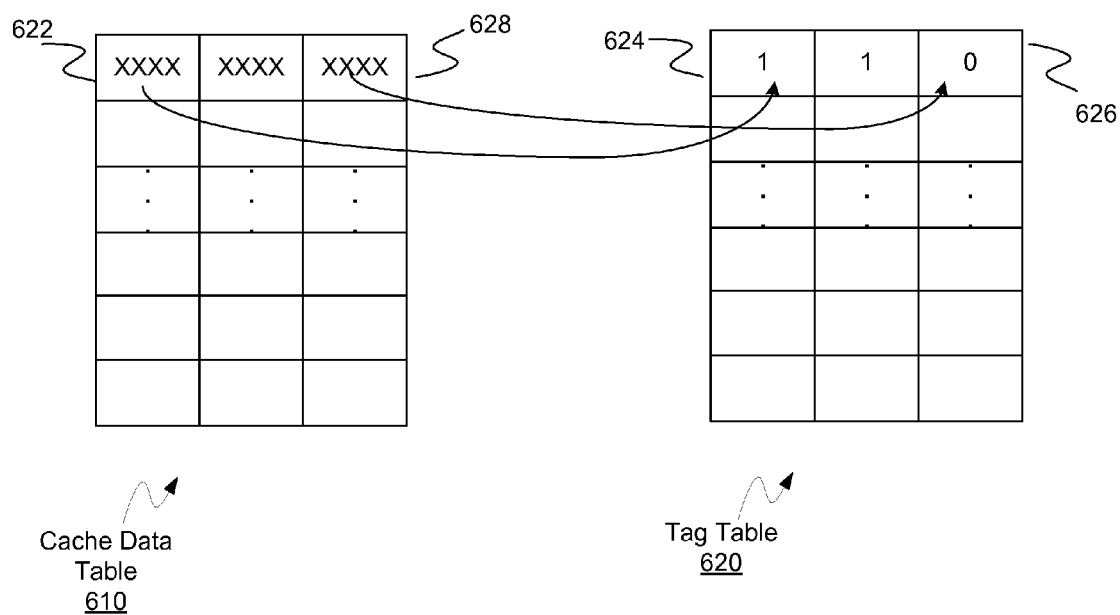
FIG. 6 illustrates current window cached sub-block data correspondence to a tag table in accordance with an embodiment of the present invention.

FIG. 6 illustrates a current window cached sub-block data table correspondence to entries in a tag table in accordance to an embodiment of the present invention. A current sliding window cache data table 610 is shown with three columns, the numbers of columns and rows can change depending on system design. The three columns correspond one to one to a tag table 620. Each cache line of data is associated with a tag entry. The entries to the tag table 620 determine whether corresponding entries in the current sliding window cached data table 610 contains valid data or invalid data. For example, an entry "1" at box 624 indicates the corresponding data entry at box 622 is valid. Similarly, an entry "0" at box 626 indicates the corresponding data entry at box 628 is invalid.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Moreover, the above disclosure is not intended to limit the present invention. The scope of the present invention is defined by the claims.

We claim:

1. A method for processing a current macro-block of a current frame for motion compensation based on reference data from a reference frame using a sliding window cache to cache the reference data, the steps comprising:
    processing a current sub-block of the current macro-block for motion compensation;
    determining the reference data for the current sub-block based on a reference sub-block in the reference frame;
    determining whether the reference data is within a sliding window for the reference frame, wherein sub-blocks of the sliding window cache have a one-to-one mapping to entries of a tag table, and wherein a corresponding entry of the tag table for any one of the sub-blocks of the sliding window cache indicates whether data stored in the sliding window cache for the any one of the sub-blocks of the sliding window is valid data;
    if the reference data is within the sliding window, checking for a valid tag of the tag table corresponding to the reference data;
    responsive to the valid tag, retrieving the reference data from within the sliding window cache if the valid tag is valid; and
    processing the reference data for motion compensation.

2. The method for processing according to claim 1, wherein the step of checking for a valid tag corresponding to the reference data is an invalid tag further comprises retrieving the reference data from memory using a DRAM controller.

3. The method for processing according to claim 2, further comprising the steps of updating a valid tag corresponding to the reference data and updating the sliding window cache with the reference data.

4. The method of processing according to claim 1, wherein the determination of the reference data is not within the sliding window further comprises retrieving the reference data from memory using a DRAM controller.

5. The method of processing according to claim 1, wherein the current frame is a p-frame.

6. The method of processing according to claim 1, wherein the current frame is a b-frame and the step of determining the reference data for the current sub-block based on a reference sub-block of a reference macro-block of the reference frame includes the steps of:
   determining a first reference data for the current sub-block based on a first reference sub-block of a first reference macro-block of the first reference frame;
   determining a second reference data for the current sub-block based on a second reference sub-block of a second macro-bock of a second reference frame; and
   weighing the determined first reference data with the determined second reference data to obtain interpolated data for the current sub-block.

7. The method of processing according to claim 6, wherein the step of determining a first reference data for the current sub-block based on a first reference sub-block of a first reference macro-block of the first reference frame includes:
   determining whether the first reference data is within a sliding window;
   if the first reference data is within the sliding window, checking for a valid tag corresponding to the first reference data;
   responsive to the valid tag, retrieving the first reference data from within the sliding window cache; and
   processing the first reference data for motion compensation.

8. The method for processing according to claim 7, wherein the step of checking for a valid tag corresponding to the first reference data is an invalid tag further comprises retrieving the first reference data from memory using a DRAM controller.

9. The method for processing according to claim 8, further comprising the steps of updating a valid tag corresponding to the first reference data and updating a first sliding window cache with the first reference data.

10. The method of processing according to claim 7, wherein the determination of the first reference data is not within the first sliding window further comprises retrieving the first reference data from memory using a DRAM controller.

11. The method of processing according to claim 6, wherein the step of determining a second reference data for the current sub-block based on a second reference sub-block of a second reference macro-block of a second reference frame includes:
   determining whether the second reference data is within a second sliding window;
   if the second reference data is within the second sliding window, checking for a valid tag corresponding to the second reference data;
   responsive to the valid tag, retrieving the second reference data from within the sliding window cache; and
   processing the second reference data for motion compensation.

12. The method of processing according to claim 11, wherein the step of checking for a valid tag corresponding to the second reference data is an invalid tag further comprises retrieving the second reference data from memory using a DRAM controller.

13. The method for processing according to claim 12, further comprising the steps of updating a valid tag corresponding to the second reference data and updating a second sliding window cache with the second reference data.

14. The method of processing according to claim 11, wherein the determination of the second reference data is not within the second sliding window further comprises retrieving the second reference data from memory using a DRAM controller.

15. The method of processing according to claim 1, wherein the sliding window is six macro-blocks by three macro-blocks.

16. The method of processing according to claim 1 further comprising the step of shifting the sliding window by one macro-block column when the current sub-blocks for the current macro-block have been processed.

17. The method of processing according to claim 1 further comprising the step of shifting the sliding window from a current sliding window to a new sliding window when the current sub-blocks for the current macro-block have been processed.

18. The method of processing according to claim 17, wherein the step of shifting the sliding window from a current sliding window to a new sliding window includes no overlap between the current sliding window and the new sliding window.

19. The method of processing according to claim 1, wherein table locations of the entries in the tag table mirror table locations of the sub-blocks of the sliding window in the sliding window cache.

20. The method of processing according to claim 1, wherein motion compensation of the current frame is based on reference data from a plurality of reference frames, and wherein each of the reference frames has a respective sliding window cache to store reference data for the corresponding one of the reference frames.

* * * * *